United States Patent
Babej

(10) Patent No.: US 7,878,746 B2
(45) Date of Patent: Feb. 1, 2011

(54) FUNCTIONAL ELEMENT, ASSEMBLING COMPONENT CONSISTING OF THE FUNCTIONAL ELEMENT COMBINED WITH A METAL SHEET, METHOD FOR PRODUCING THE ASSEMBLY COMPONENT AND METHOD FOR PRODUCING THE FUNCTIONAL ELEMENT

(75) Inventor: Jiri Babej, Lich (DE)

(73) Assignee: Profil Verbindungstechnik GmbH & Co. KG, Friedrichsdorf (DE)

( * ) Notice: Subject to any disclaimer, the term of this patent is extended or adjusted under 35 U.S.C. 154(b) by 717 days.

(21) Appl. No.: 10/595,837

(22) PCT Filed: Nov. 16, 2004

(86) PCT No.: PCT/EP2004/012991

§ 371 (c)(1),
(2), (4) Date: Sep. 20, 2006

(87) PCT Pub. No.: WO2005/050034

PCT Pub. Date: Jun. 2, 2005

(65) Prior Publication Data

US 2008/0199274 A1      Aug. 21, 2008

(30) Foreign Application Priority Data

Nov. 17, 2003   (DE)   ................................ 103 53 642

(51) Int. Cl.
*F16B 37/04*   (2006.01)
(52) U.S. Cl. .................. 411/179; 411/180; 411/188
(58) Field of Classification Search ......... 411/179–181, 411/188
See application file for complete search history.

(56) References Cited

U.S. PATENT DOCUMENTS 3,127,919 A      4/1964   Swanstrom (Continued)

FOREIGN PATENT DOCUMENTS

DE           195 35 537 A1      3/1997

(Continued)

OTHER PUBLICATIONS

International Search Report for PCT/EP2004/012991 dated Apr. 6, 2005.

(Continued)

*Primary Examiner*—Flemming Saether
(74) *Attorney, Agent, or Firm*—Hershkovitz & Associates LLC; Abraham Hershkovitz; Eugene C. Rzucidlo

(57) ABSTRACT

The invention relates to a functional element (10) comprising a longitudinal axis (14), a body part (16), a hollow pressed part (18), an annular supporting surface (20) which is arranged on the body part, substantially extended in a perpendicular direction with respect to the longitudinal axis and is radially displaced away from the pressed part and an annular groove (21) which axially extends and is embodied in the body part radially inside the supporting surface. Locking ribs (26) are preferably provided and at least partly cross the annular groove and the free end (28) of the pressed part is provided with a annular cutting edge (30). The inventive functional element is characterised in that an annular bulge (32) is embodied on the pressed part between the annular supporting surface and the free end of the pressed part and an annular cavity (34) is embodied around said pressed part between the bulge and the front free end thereof. An assembling component consisting of the functional element combined with a metal sheet, a method for producing the assembling component and a method for producing the functional element are also disclosed.

23 Claims, 4 Drawing Sheets

U.S. PATENT DOCUMENTS

| | | | |
|---|---|---|---|
| 3,242,962 A | * | 3/1966 | Dupree ........................ 411/180 |
| 3,276,499 A | | 10/1966 | Reusser et al. |
| 3,405,752 A | * | 10/1968 | Neuschotz .................. 411/180 |
| 3,461,936 A | * | 8/1969 | Rosan, Sr ................... 411/180 |
| 3,571,903 A | * | 3/1971 | Persson ..................... 29/432.1 |
| 3,736,969 A | | 6/1973 | Warn et al. |
| 3,770,037 A | * | 11/1973 | Ernest ........................ 411/184 |
| 4,637,766 A | * | 1/1987 | Milliser ...................... 411/180 |
| 4,978,270 A | * | 12/1990 | Ackerman .................. 411/511 |
| 5,513,933 A | * | 5/1996 | Rom .......................... 411/180 |
| 5,613,815 A | * | 3/1997 | Muller ....................... 411/181 |
| 5,797,175 A | * | 8/1998 | Schneider .................... 29/520 |
| 6,125,524 A | * | 10/2000 | Mueller ....................... 29/520 |
| 6,817,815 B2 | * | 11/2004 | Ross ......................... 411/180 |

FOREIGN PATENT DOCUMENTS

| | | |
|---|---|---|
| EP | 0 133 087 A1 | 7/1984 |
| EP | 0 678 679 A1 | 3/1995 |
| EP | 0 678 679 B1 | 3/1995 |
| EP | 0 667 936 B2 | 8/1995 |
| EP | 0 713 982 A2 | 5/1996 |
| EP | 0 713 982 B2 | 10/1999 |
| WO | WO 94/01688 | 1/1994 |

OTHER PUBLICATIONS

German Search Report dated May 19, 2005 relating to German Patent Application No. 103 53 642.6 and english language translation thereof.

* cited by examiner

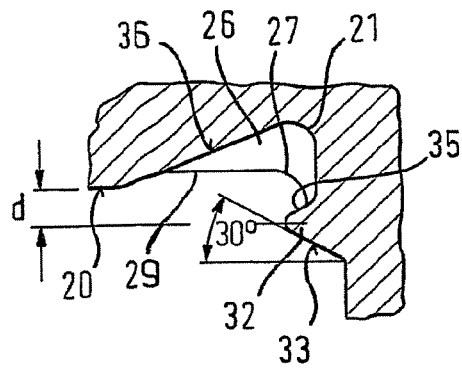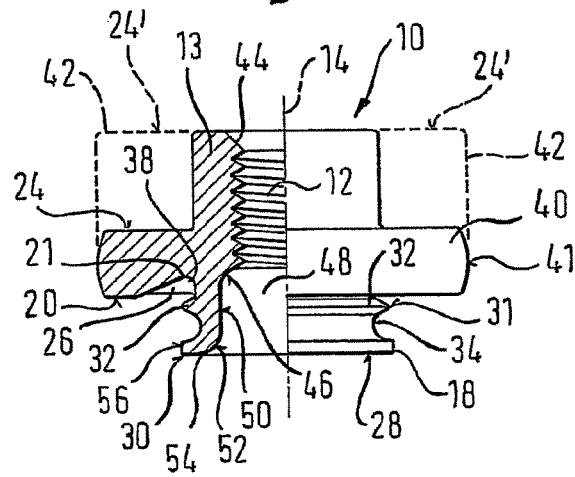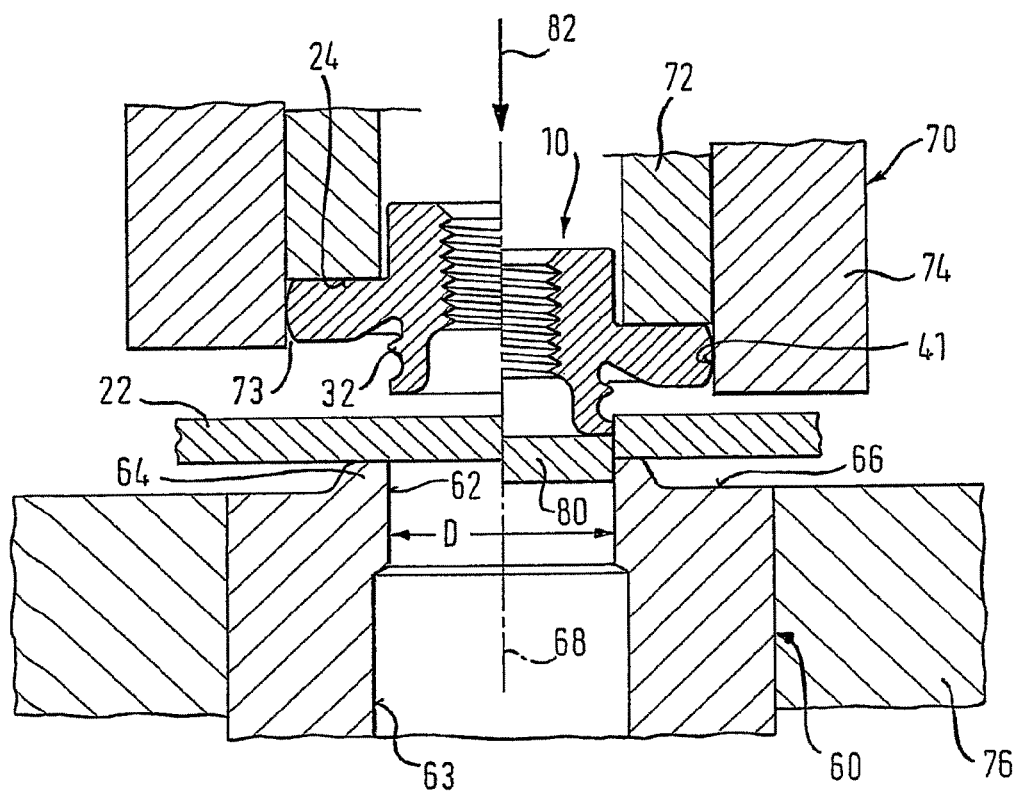

FUNCTIONAL ELEMENT, ASSEMBLING COMPONENT CONSISTING OF THE FUNCTIONAL ELEMENT COMBINED WITH A METAL SHEET, METHOD FOR PRODUCING THE ASSEMBLY COMPONENT AND METHOD FOR PRODUCING THE FUNCTIONAL ELEMENT

CROSS-REFERENCE TO RELATED APPLICATIONS

This application claims priority from PCT/EP04/12991 filed on Nov. 16, 2004, which claims priority of German Patent Application No. 103 53 642.6, filed Nov. 17, 2003, the disclosures of which is expressly incorporated by reference herein in their entireties.

FIELD OF THE INVENTION

The present invention relates to a functional element having a longitudinal axis, a body section, a hollow piercing section, a ring-like contact surface at the body part, which extends substantially perpendicular to the longitudinal axis and radially away from the piercing section, and an axially extending ring groove which is provided in the body section radially inside the contact surface, with the functional element being designed for attachment to a component which is a plate-like shape at least in the region of the attachment, in particular to a sheet metal part, wherein the body section has a pressing surface at the side remote from the piercing section and wherein ribs provided security against rotation are preferably provided which cross the ring groove at least in part and wherein the free end of the piercing section is provided with a ring-like cutting edge. Furthermore the present invention relates to a component assembly, to a method for manufacture of a component assembly and also to a method for the manufacture of the functional element.

BACKGROUND OF THE INVENTION

A functional element of the initially named kind is known from EP 0 713 982 B1.

Although the known element can also be self-piercingly introduced into a sheet metal part, the element is not ideally designed for this purpose.

A further functional element which is at least similar to the element of EP 0 713 982 B1 at a first glance is known from EP 0 678 679 B1, but does not have a piercing section and is not suitable for the self-piercing introduction into a sheet metal part.

SUMMARY OF THE INVENTION

The object underlying the present invention is to provide a functional element of the initially named kind which is particularly suited for the self-piercing introduction into a sheet metal part, which can be manufactured at reasonable cost and which can also be used with a broad spectrum of sheet metal thicknesses, without the functional element having to have a special design for each sheet metal thickness.

In order to satisfy this object a functional element of the initially named kind is provided which is characterized in that a ring-like bead is provided at the piercing section between the ring-like contact surface and the free end of the piercing section and in that a ring recess is preferably provided around the piercing section between the bead and the free end face of the piercing section.

The diameter of the piercing section at the ring-like cutting edge can be larger than the maximum transverse dimension of the ring-like bead, but can also be of the same size or smaller than this maximum transverse dimension.

In all these variants, with a suitable design of the die button that is used, it can be ensured that, on the attachment of the functional element to a sheet metal part, a clean piercing slug arises out of the sheet metal part, through the cooperation between the ring-like cutting edge of the piercing section and the central bore of the die button used to manufacture the component assembly consisting of the functional element and the sheet metal part. On the other hand, in particular when using thinner sheet metal parts, it can, however, also be ensured that the sheet metal material can be guided past the ring-like bead without damaging the latter.

When using thicker sheet metal parts, the ring projection of the die button moves, depending on the specific dimensions of the sheet metal part and the functional element, less far in the longitudinal direction of the piercing section, past the ring-like cutting edge, so that the end face boundary of the bore of the die button does not reach the ring-like bead. The sheet metal part is then pressed into the ring-like recess between the ring-like bead and the ring-like cutting edge, and indeed without the sheet metal material being unnecessarily thinned between the apex of the ring-like bead and the end face boundary of the die button when unfavourable sheet metal thicknesses are present. In this manner the sheet metal material engages around the ring-like bead and contributes to the press-out and pull-out resistance.

It is particularly favourable when the ring groove runs out into the ring-like contact surface via an at least substantially conical surface.

On attachment of the functional element to the sheet metal part, sheet metal material is pressed by the die button into the ring groove and a smooth transition is present from the sheet metal material in the groove to the sheet metal material at the ring-like contact surface, whereby the sheet metal part is not unnecessarily thinned or injured in this region.

The ring-like bead preferably has an at least substantially triangular shape in an axial section plane. This is a stable shape for the ring bead and also leads to an excellent engagement between the ring bead and the sheet metal material.

The ring recess preferably extends radially inside the ring-like bead and is likewise preferably bounded by the ring-like bead at the side remote from the free end face of the piercing section. This design leads to a compact and on the whole short design of the piercing section and permits a sensible design of the functional element so that this can, on the one hand, be used with different sheet metal thicknesses.

The functional element can be realized as a fastener element, for example as a hollow fastener element, which has a fastener section provided to receive a bolt.

In the event that the functional element is realized as a fastener element, it can be favourable to form the body part with a flange section with the ring-like contact surface and the axially extending ring groove being provided at or in the flange section at its side facing the flange section. The side of the flange section remote from the piercing section is preferably formed as a ring-like contact surface, with a plunger for the attachment of the functional element to a sheet metal part preferably pressing against the ring-like contact surface. This has the advantage that any thread which may be provided in the functional element is not deformed under the action of the force exerted by the plunger onto the flange section.

The fastener section can have one of the designs which are specified in claim 9.

When the functional element is realized as a fastener element, it is necessary to take measures to retain the functional element in the sheet metal part in a manner secured against rotation. In order to achieve this, features providing security against rotation are preferably to be provided, for example in the ring groove. In accordance with a particularly preferred embodiment, the base surface of the ring groove is provided on at least a part of its radial extent with noses providing security against rotation and/or grooves providing security against rotation. It is most favourable when ribs providing security against rotation are provided which bridge the peripherally extending recess.

In accordance with a particularly preferred embodiment of the ribs providing security against rotation, these extend in raised manner in the radial direction within the ring groove and furthermore in raised manner in the axial direction within the ring groove up to the bead. This signifies that the ribs providing security against rotation have an at least substantially rectangular shape with two limbs.

In this connection, the radially extending sections of the ribs providing security against rotation do not project in the radial direction beyond the apex point of the bead and they can with advantage also be set back slightly radially with respect to the apex point.

It is particularly favourable when the ring-like bead has the shape of at least one turn of a thread. As a result of the pitch of the thread it can be ensured that a part of the bead is always in engagement with the sheet metal part irrespective of the respective thickness of the sheet metal, whereby, on the one hand, the resistance to rotation and, on the other hand, also the resistance to pull-out or press-out can be increased.

It is particularly favourable when the bead has the shape of at least two sections of a turn of a thread, since the engagement of the sheet metal material with the bead takes place independently of the sheet metal thickness at angularly spaced regions of the sections.

An arrangement is particularly preferred in which the bead has the shape of sections of a turn of a left hand thread and of a turn of a right hand thread which are alternately arranged around the longitudinal axis. This not only increases the resistance to rotation in both directions, but also ensures that the thread or the thread sections lie in regions which can be considered with a large number of possible sheet metal thicknesses. It is in particular favourable when the turn sections are connected to one another and preferably form a closed ring. In this example four turn sections could, for example, be provided.

The functional element can not only be realized as a fastener element. Instead of this, the functional element could for example be realized as a hollow sleeve which is designed to receive a rotatable shaft or a pin-like clip. Furthermore, the functional element could be designed such that a pin projects away from the body part, and indeed preferably at the side of the body part which is remote from the piercing section. The pin could also be realized as a clip mount whereby, for example, a carpet or the like can be clipped onto the pin.

Particularly preferred embodiments of the functional element of the invention and also of the component assembly, the method for manufacturing the component assembly and the method for manufacturing the functional element can be seen from the patent claims.

BRIEF DESCRIPTION OF THE DRAWINGS

The invention will be explained in the following in more detail with reference to embodiments and to the drawing in which are shown:

FIG. 1 a side view of a functional element in accordance with the invention, and indeed in an axial section onto the left hand side of the central longitudinal axis and from the outside onto the right hand side of the central longitudinal axis, FIG. 1A an enlarged representation of the element of FIG. 1 in an axial section and in the region of a ring groove in which the ribs providing security against rotation are arranged, FIG. 2 a schematic representation of the attachment of the functional element of FIG. 1 to a sheet metal part and indeed in a first stage at the left hand side of the central longitudinal axis and in a second stage at the right hand side of the central longitudinal axis, FIG. 3 a representation after the completion of the attachment method of FIG. 2, FIG. 4 a schematic illustration of a functional element in accordance with the invention after the attachment to a sheet metal part with a special design of the sheet metal part, FIG. 5 a schematic representation of a further embodiment of a functional element in accordance with the invention similar to FIG. 1, FIGS. 6, 7, 8, 9 a series of drawings to explain the manufacture of a functional element in accordance with the invention by cold heading and FIG. 10 a side view of the finished functional element in accordance with FIG. 9, with FIG. 10 simultaneously showing a further embodiment of a functional element in accordance with the invention.

DETAILED DESCRIPTION OF THE INVENTION

Figure 3:
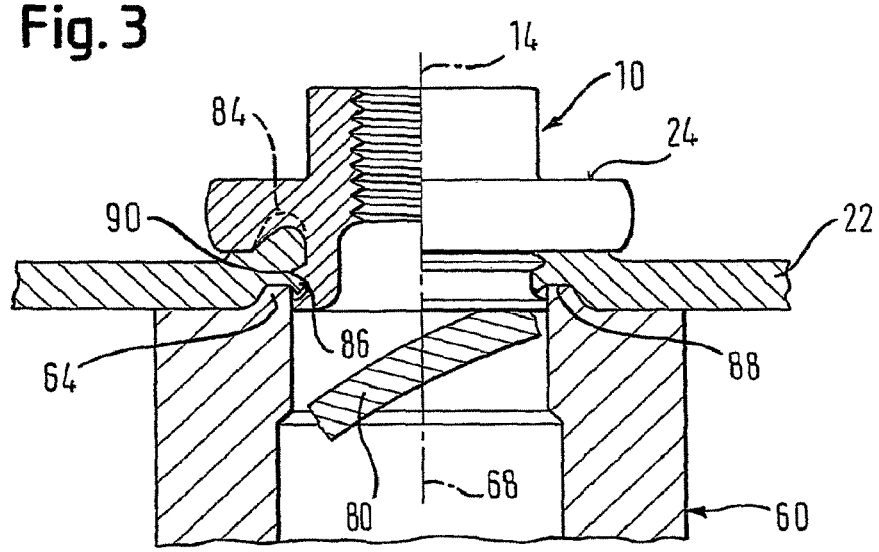

FIG. 1 shows a functional element 10 in accordance with the invention having a longitudinal axis 14, a body part 16, a hollow piercing section 18, a ring-like contact surface 20 at the body part which lies in a plane arranged substantially perpendicular to the longitudinal axis 14 and extends radially away from the piercing section 18 and an axially extending ring groove 21 which is provided in the body section radially inside of the contact surface. The functional element is designed for attachment to a component 22 having a plate-like shape at least in the region of the attachment (FIG. 2), in particular to a sheet metal part. Furthermore, the body part 16 has a ring-like pressing surface 24 at the side remote from the piercing section 18.

On the attachment of the functional element to a sheet metal part, pressure is exerted against the pressing surface 24 by means of a plunger as will later be explained in more detail with reference to FIGS. 2 to 4.

Ribs 26 providing security against rotation, which can best be seen from the detailed drawing of FIG. 1A, cross the ring groove 22 in this example. Such ribs providing security against rotation are in particular required if the functional element is a fastener element, as shown here in the form of a nut element with an internal thread 12. The free end 28 of the piercing section 18 is provided with a ring-like cutting edge 20.

The design of the piercing section of the fastener element 10 is of particular importance in accordance with the invention. One sees from FIG. 1 that a ring-like bead 32, which in this example is formed as a closed ring bead, is provided at the piercing section between the ring-like contact surface 20 and the free end 28 of the piercing section 18. Furthermore, a ring recess 34 around the piercing section is located between the bead and the free end face of the piercing section.

In this example, the ring-like cutting edge (30) lies radially further outwardly than the apex of the bead. I.e. the diameter of the cutting edge is dimensioned such that it is larger than the maximum transverse dimension of the bead 32. In the case of the ring-like bead 32 of the embodiment of FIG. 1 the bead is of circular shape at the tip whereby the maximum transverse dimension corresponds to the diameter of the ring bead at the tip. When the ring bead has, in accordance with a preferred embodiment, the shape of a thread turn, i.e. the turn of a thread or the form of thread turns or of sections of a thread turn, the apex points of the bead always lie on the surface of an imaginary envelope cylinder (106 in FIG. 5), the diameter of which then represents the maximum transverse dimension of the thread.

It is, however, not absolutely essential that the diameter of the ring-like cutting edge 20 is larger than the maximum transverse dimension of the bead 32. Instead of this, the diameter of the ring-like cutting edge 30 could correspond to the maximum transverse dimension of the bead 32 or be smaller than it.

As is evident from FIG. 1 and above all from FIG. 1A, the ring groove 21 runs out via an at least substantially conical surface 36 into the ring-like contact surface 20. At the radially inner side, the axially extending ring groove 21 forms, together with the bead 32, a radial ring groove 38 which is rounded in cross-section, in particular in the base region of the ring groove which is located in the body section 16.

As can likewise best be seen from FIG. 1A the ring-like bead 32 has an at least substantially triangular shape in an axial section plane and in this example both side flanks 33, 35 of the bead form an angle of at least substantially 30° with a plane perpendicular to the central longitudinal axis of the element, as is shown for the lower flank 33.

The ring recess 34 extends radially within the ring-like bead, i.e. radially within the envelope cylinder which defines the locus of the apex points of the bead, and the ring recess is preferably bounded at the side remote from the free end face of the piercing section, preferably by the ring-like bead, i.e. it merges gently into this ring-like bead without an intermediate region.

The ring recess 34 itself is of at least substantially U-shape seen in an axial section plane and preferably has at least substantially the shape of a semi-circle.

In this example the body section 16 is provided with a flange section 40, with the ring-like contact surface 20 and the axially extending groove 21 being provided at or in the flange section 40 at its side facing the piercing section, whereas the side of the flange section 40 remote from the piercing section forms the ring-like pressing surface 24. This shape of the functional element, which can for example be favourable for a fastener element, is not absolutely essentially; instead of this, the jacket surface of the body section 16 could extend in accordance with the broken line 42 in FIG. 1, with the ring-like pressing surface then being located at the upper end of the functional element in FIG. 1 as indicated at 24'.

As stated, the functional element of FIG. 1 is formed as a nut element with a thread 12, with the thread 12 running out into a conical thread run-out recess at the upper end face 44 of the functional element.

One sees in FIG. 1 that the fastener section 13 of the fastener element defined by the thread 12 is located exclusively in the region of the body part 16 and merges at its lower end in FIG. 1 via a conical or rounded surface 46 into a cylindrical hollow space 50 with a diameter which is somewhat larger than the outer diameter of the thread cylinder 12. The cylinder 50 in turn merges via an either conical or slightly rounded ring surface 52 into the lower ring-like end face 54 of the piercing section 18 at the free end face 28 of the piercing section. The ring-like end face 54 lies in this example in a plane which stands perpendicular to the central longitudinal axis 14 of the element. This is, however, not absolutely essential. The ring-like end face 54 could also be formed as a conical surface with an included cone angle smaller than 180°, for example in the range from 180° to 150° or less.

This form of the element 10 or of the hollow space 48 is, on the one hand, technically favourable in the manufacture of the functional element and facilitates, on the other hand, the introduction of a screw into the thread from below, since the ring-like surface 52, the cylindrical surface 50 and the rounded or conical surface 46 serve for progressive centring of the screw when it is introduced into the thread 12.

It is likewise evident from FIG. 1 that the ring-like cutting edge 30 at the lower side is formed by the planar ring-like end face 54 of the functional element, i.e. by a surface which stands perpendicular to the longitudinal axis of the functional element and is surrounded at the radially outer side by a cylindrical surface 56, i.e. the ring-like cutting edge represents the intersection of the cylindrical surface 56 and the end face 54.

Although, in this example, the fastener section defined by the thread 12 is fully located in the body part 16 of the functional element, this is only one of the possible positions of the fastener section, i.e. the fastener section of the thread 12 could have one of the following designs:

a) it is located at the side of the flange section 40 remote from the piercing section 18, b) it is located at the side of the flange section 40 remote from the piercing section 18 and extends at least partly into the flange section 40, c) it is located at the side of the flange section 40 remote from the piercing section 18 and extends through the total axial thickness of the flange section 40, d) it is located at the side of the flange section 40 remote from the piercing section 18 and extends through the total axial thickness of the flange section 40 and also through a part of the axial length of the piercing section 18, e) it is located at the side of the flange section 40 remote from the piercing section 18 and extends through the total axial thickness of the flange section and also through the total axial length of the piercing section 18, f) it is located at the side of the flange section 40 adjacent the piercing section 18 and extends through a part of the axial thickness of the flange section 40 and also through a part of the total axial length of the piercing section 18, g) it is located at the side of the flange section 40 remote from the piercing section 18 and extends through a part of the axial thickness of the flange section 40 and also through the total axial length of the piercing section, h) it is located at the side of the flange section 40 adjacent the piercing section 18 and extends only through the total axial length of the piercing section 18, i) it is located at the side of the flange section 40 adjacent the piercing section 18 and extends only through a part of the total axial length of the piercing section 18.

The fastener section 13 need not be provided from the outset with a thread 12, but rather a smooth bore could be present here which is subsequently provided with a thread, for example in that the thread is formed when screwing in a thread-forming or thread-cutting screw.

As is evident from FIG. 1A, the ring groove 21 is not only bridged in the radial direction by the ribs 26 providing security against rotation, but rather these also extend in raised manner in the axial direction along the piercing section 18 up to the top side 35 of the ring bead 32. A rounded shape is preferably present at the transition between the radially extending region of the ribs providing security against rotation and the axially extending region of these ribs providing security against rotation radially within the ring bead 21.

In this example the undersides 29 of the ribs 26 providing security against rotation are set back slightly from the ring-like contact surface 20, for example by approximately 0.02 mm. The distance "d" between the ring-like contact surface 20 and the apex point of the ring bead 32 amounts, for example, to 0.3 mm in an element with an M8 thread. Furthermore, in this example, the maximum transverse dimension of the ring bead 32 amounts to 13.3 mm, the diameter of the cutting edge to 13.5 mm and the diameter in the base region of the ring groove 34 to 12 mm. The suitable sheet metal part could, for example, have a thickness in the range between 0.6 mm and 4 mm, for example 1.7 mm.

The terms top side, underside, etc. as used here relate solely to the geometrical representation in the Figures and do not represent any restriction of the spatial arrangement of the functional element.

The attachment of the functional element in accordance with FIGS. 1, 1A to a plate-like component will now be explained. The term "plate-like component" admittedly includes primarily sheet metal parts, the use of the functional element of the invention is, however, in no way restricted to the use with sheet metal parts.

Instead of this, the component 22 could consist of plastic or it could solely represent a wall region of a cast part which is of plate-like shape in the region of the attachment of the functional element. The functional element in accordance with the invention could also be used with sandwich components, i.e. with components which are described in the EP application 01 927 700.3. The plate-like component could also be a component which consists of plastic with a sheet metal insert in the region of the attachment of the functional element.

With reference to FIG. 2, it is evident that the sheet metal part 22 is supported on a die button 60 which has a bore 62 with a diameter D which is designed to receive the ring-like cutting edge 30 of the piercing section 18 of the fastener element 10. That is to say, the diameter D of the die button is fractionally larger than the diameter of the ring-like cutting edge 30.

The bore 62 of the die button 60 is surrounded by a ring projection 64 which merges at the side radially remote from the bore into a surface 66 perpendicular to the longitudinal axis 68 of the bore, with the longitudinal axis 68 of the bore being at least substantially aligned with the longitudinal axis 14 of the fastener element 10.

The functional element 10 is, as is schematically illustrated in FIG. 2, received in a setting head 70 with a plunger 72 which acts on the ring-like pressing surface 24 and with a tubular housing part 74 which forms a receiver 73 for the fastener element 10, the housing part surrounding the jacket surface 41 of the flange section 40 and centring the functional element with reference to the die button (60).

The setting head 70 is arranged in known manner at the upper tool of a press (not shown) and is designed in the customary way and means so that the respective nut element 10 is received in the recess 73 of the setting head before the setting head 70 is moved with the upper tool of the press in the direction of the arrow 82 towards the sheet metal part 22. The recess 73 can, for example, be equipped with magnets (not shown) in order to hold the functional element 10 which is, for example, placed into the recess by a robot. In this connection the die button 60 is arranged in a lower tool 76 of the press which is, for example, installed on an intermediate plate of the press or on the press table. It is also possible to install the setting head 70 at the intermediate plate of the press and to accommodate the die button 60 in a lower tool at the press table. It is likewise possible to arrange the setting head 70 in the lower tool 76 of the press so that the end face opening of the recess 73 faces upwardly instead of downwardly and then to arrange the die button 60 at the intermediate plate of the press or at the upper tool of the press. The setting head 70 and/or the die button 60 can also be carried by a robot or be installed in a C-frame with feed for the die button and/or the setting head.

In the embodiment of FIG. 2, the setting head 68 is shown as a solid setting head with a plunger 72 fixedly arranged in the housing.

The design of the setting head 70 can, however, take place precisely in the manner shown in FIGS. 24 to 38 of EP-B-755 749 as an alternative to the illustrated variant. An embodiment of this kind has the advantage that the functional elements 10 can be guided into the recess of the setting head via a feed passage and can then be pressed by the means of the plunger against the sheet metal part.

On closing the press, the functional element 10 moves, after insertion of the sheet metal part into the press above the die button, from the position which is shown at the left hand side of FIG. 2 continuously closer in the direction of the sheet metal part, where, as shown at the right hand side of FIG. 2, the lower end face 28 of the piercing section 18 has just started to cut a circular piercing slug 18 out of the sheet metal part together with the ring projection 64 of the die button which supports the sheet metal part 22. The piercing slug 80 falls through the bore 62 of the die button into the region of the enlarged bore 63 and can then be disposed of out of the die button in known manner.

With complete closure of the press (or of the gripping tongs of a robot or of the actuating device of a C-frame), the functional element is then located with respect to the sheet metal part in the position in accordance with FIG. 3. That is to say, simultaneously with the cutting out of the piercing slug 80 or thereafter, through the movement of the body part 16 towards the sheet metal part 22 and the die button 60, the sheet metal material is shaped by means of the ring projection 62 into the ring groove 22 and around the ring bead 32, whereby a form-locked connection is produced between the sheet metal part and the fastener element.

In this connection, the sheet metal material is shaped around the flanks of the ribs providing security against rotation so that both in the region axially above the ring-like contact surface 20 and in the region between the apex point of the ring-like bead 32 and the base surface of the ring-like groove 21, the sheet metal material surrounds the ribs providing security against rotation at least substantially. This leads to excellent values for the security against rotation.

Although the form shown for the ribs providing security against rotation is preferred, the features providing security against rotation can also be designed differently. They could, for example, be formed by noses which are arranged on the conical surface or on the curved surface of the ring groove 22, with it being possible to provide the noses, for example, only on the one flank 36 of the ring groove 21 or only on the other flank, i.e. in the rounded region of the ring groove 21 radially inside the bead 32, or only in the base region of the ring groove. Moreover, the features providing security against rotation can be formed by recesses in the flanks and/or in the base surface of the ring-like groove as is, for example, shown by the broken line 84 in FIG. 3, with the sheet metal material then being shaped into the grooves providing security against rotation.

Through the displacement of the sheet metal material by the ring projection, the material is also driven radially inwardly against the apex of the ring-like bead so that a ring toe 86 arises, which is arranged in FIG. 3 at the lower side of the ring bead.

Since the ring bead 32 projects radially into the sheet metal material, an excellent pull-out/push-out resistance is achieved.

One can furthermore see from FIG. 3 that the ring surface 66 of the die button 60 comes to lie at least substantially in the plane of the lower end face 28 of the piercing section. This signifies that, in the screwed on situation in which a further component is screwed onto the sheet metal material 22 from below, no special measures need to be taken in order to ensure that the sheet metal part 22 is clamped between the ring-like contact surface 20 and the screwed on component. If the piercing section 18 of the functional element 10 were to project further downwardly than the lower side of the component 22 in FIG. 3 then a corresponding recess would, for example, have to be provided in the component to be screwed into place in order to ensure that the clamping forces act between the functional element 10 and the screwed on component via the sheet metal part 22 and to prevent the sheet metal part so to say lying loosely between the body section 16 or the functional element and the screwed on component, which would be the case if the component were only supported at the lower end of the piercing section 18.

FIG. 3 shows the screwed on situation with a relatively thick sheet metal part 22. If an even thicker sheet metal part is used, then the excess sheet metal material can further fill out the ring recess 34 whereby an even firmer attachment of the functional element to the sheet metal part 22 is made possible, since the lower side of the ring recess also contacts the sheet metal material in form-locked manner and thus increases the value of the pull-out/push-out resistance. Through the increased friction area between the sheet metal material, the resistance against rotation is also increased.

If, however, a thinner sheet metal part is used, then no ring toe 86 arises, but rather the sheet metal material engages into the ring groove 21 only in the region above the ring bead 32.

Since a good overlap is also present here between the ribs providing security against rotation and the sheet metal material, or between the features providing security against rotation in the sheet metal material when the features providing security against rotation are formed by noses and/or recesses, a very good resistance against rotation is also achieved with thin sheet metal.

In this embodiment a good pull-out resistance and press-out resistance is, however, also achievable because the bead 32 now engages at the lower side of the sheet metal material which is shaped into the ring groove 21.

One can see from this explanation that one and the same functional element can be used for sheet metal parts with various thicknesses which reduces the storage and ultimately the manufacturing costs.

For the different sheet metal thicknesses, it is only necessary to provide different die buttons, the ring projections of which are dimensioned such that the sheet metal material always flows into the ring groove 22 and around the ring bead 32. By determining the excess dimension by which the lower end face of the housing 74 of the setting head 70 projects downwardly below the ring-like contact surface 20 of the functional element, it can also be ensured that, in the in-built situation, the lower side of the sheet metal part always lies approximately in the plane of the end face 28 of the functional element or slightly below it. If necessary washers can also be used with very thin sheet metal parts which are arranged between the sheet metal part 22 and the component to be screwed into place, in order to ensure that the sheet metal part 22 is always clamped in orderly manner between the body part 16 of the functional element 10 and the component screwed into place.

If the component to be screwed into place is a flange of a housing or the like, then the flange can be provided with a stepped bore in the event that the piercing section projects below the underside of the sheet metal part, with the stepped bore receiving the piercing section and also ensuring that the sheet metal part is clamped in an orderly manner via the component between the body section 16 or the functional element 10 and the head of the bolt that is used.

In all these embodiments the sheet metal material in the region of the fastener element is pressed flat radially outside of a recess 88 caused by the ring projection 64 of the die button. Furthermore, the sheet metal material is at least partly shaped to a ring groove 90 at least partly surrounding the bead 32.

Figure 4:
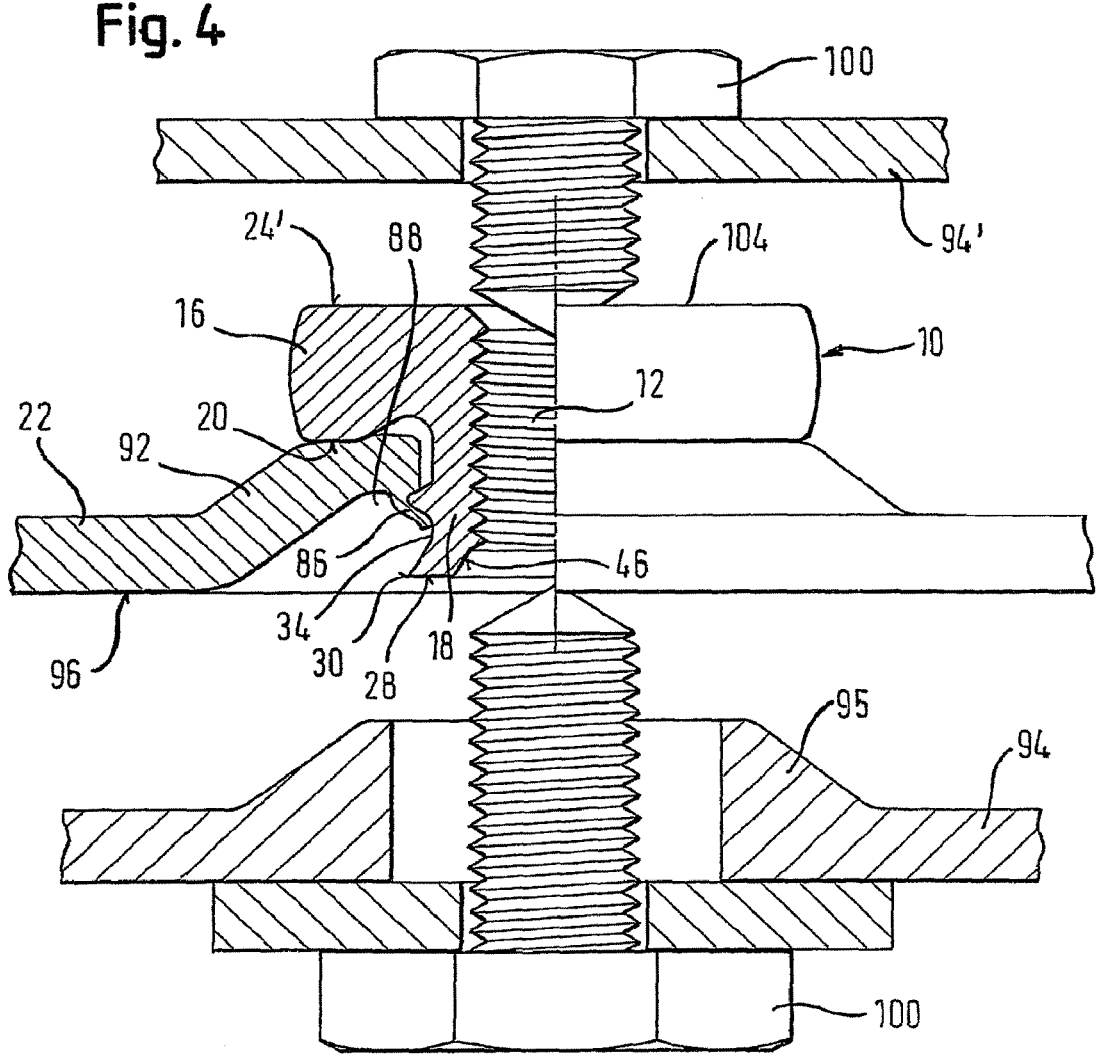

FIG. 4 shows an alternative representation of a functional element in accordance with the invention which in this example is attached to a relatively thin sheet metal part.

The functional element of FIG. 4 deviates from the functional element in accordance with the previous embodiments to the extent that the body section 16 is not provided here with a radially projecting flange part 40. Furthermore, the fastener section 12 of the functional element in accordance with FIG. 4 here not only extends within the body section 16, but rather also into the piercing section 18, so that the cylindrical hollow space 48 of FIG. 1 is missing here and the thread 12 is bounded at its lower end solely by a conical surface 46. The ring-like cutting edge 30 merges in this example into the ring recess 34 not via a cylindrical surface, but rather via a conical surface which extends at least substantially parallel to the conical surface 46.

Through a suitable shaping of the housing of the setting head (not shown here) and also of the end face of the die button (likewise not shown), the sheet metal material is shaped in this embodiment into a clear conical shape 92, which ensures a very stiff attachment of the functional element 10 to the sheet metal part 22, and moreover ensures that the lower side 96 of the sheet metal part lies slightly below the lower end face 28 of the piercing section 18 of the functional element. In the screwed on situation, the clamping forces which are produced between the functional element 10 and a component screwed on from below admittedly extend here through the conical shape 92 of the sheet metal part 22. This is, however, nevertheless a very stable arrangement because the clamping forces attempt to press the sheet metal part 22 flatter in the region of the conical shape 92, whereby this region is stiffened and on the whole a very stiff attachment is present. It is also possible, as likewise shown in FIG. 4, to provide the component 94 which is to be screwed into place with a corresponding shape 96 in the region of the pronounced ring recess of the conical shape and to attach the component by a bolt 100 to a sheet metal part.

One also sees from FIG. 4 that it is always possible with a suitable choice of the shape of the ring projection of the die button to ensure that sheet metal material surrounds the ring-like bead 32 and is also shaped into the ring recess 34, whereby the above-mentioned resistance values for the security against rotation and for pull-out and press-out can be increased.

It is also schematically indicated in FIG. 4 how a component 94' can be screwed onto the top side of the functional element which is basically also possible.

Since, in this functional element, the piercing section 18 of the functional element is not deformed on the attachment of the sheet metal part 22, it need not be feared that the fastener section, for example the thread 12, is deformed during the attachment, which is why the thread 12 can straight-forwardly extend into the piercing section 18.

Figure 5:
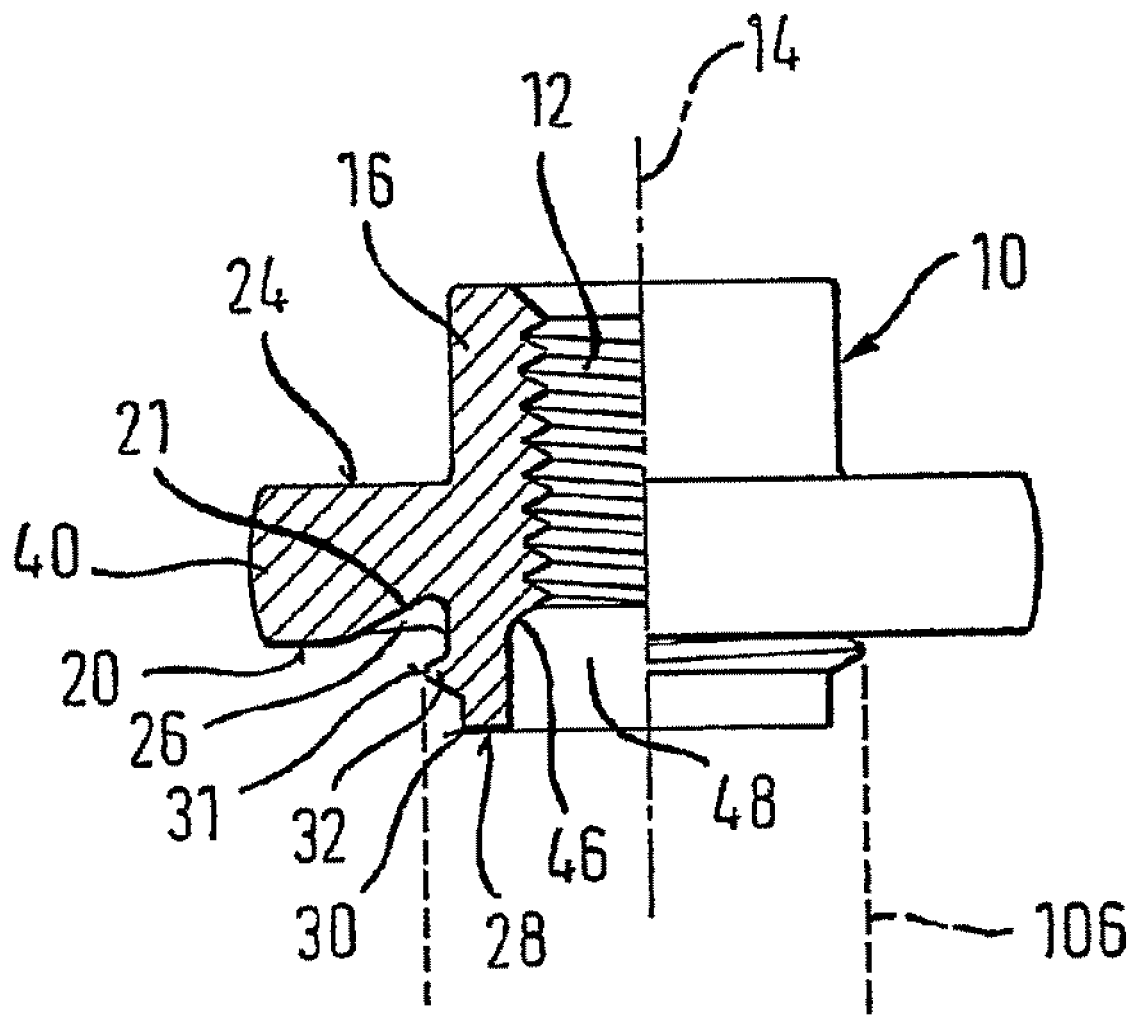

A design in accordance with FIG. 5 is also conceivable in which the diameter of the ring-like cutting edge 30 is significantly smaller than the diameter of the imaginary cylindrical surface 106 at which the apex points 31 of the ring bead 32 lie. Here, through a suitable shape of the ring projection of the die button, it can also be ensured that the sheet metal material is not unnecessarily thinned and weakened in the region between the ring projection 64 of the die button 60 and the ring bead 32. In the embodiment of FIG. 5, no ring recess is present, but rather the piercing section 18 is at least substantially cylindrical in the lower region.

Using a die button (not shown) similar to the die button 60, the sheet metal material is first drawn in the example of FIG. 5 between the cutting edge 30 and the ring projection 64, which has a diameter larger than that of the ring bead 32, to form a conical recess and the piercing slug is subsequently cut out from the base region of the conical recess. Thereafter the ring projection 64 pushes the sheet metal material, which is supported at the top and at the ring projection, into the axial ring groove 21 and also towards the apex of the ring bead by means of a preferably obliquely inwardly pointing flank. The ribs providing security against rotation moreover lead to a displacement of the sheet metal material into the radially extending region of the axial ring groove 21 above the ring bead 32.

It will now be explained with reference to FIGS. 6 to 10 how a functional element 10 of the above-described kind can be manufactured. This description is admittedly concerned with a slightly modified form of the functional element of FIG. 4, which is shown in its own right in FIG. 10, but the description also applies to all further described variants.

Figure 8:
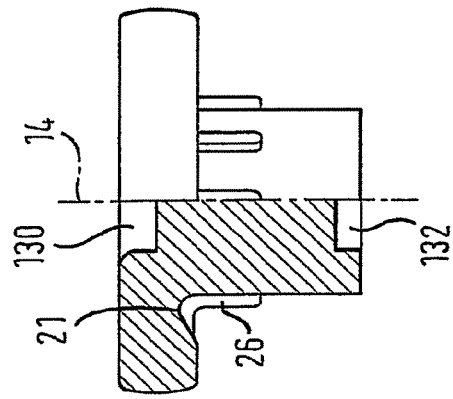
Figure 9:
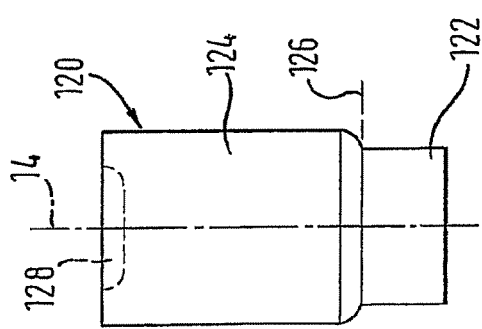
Figure 10:
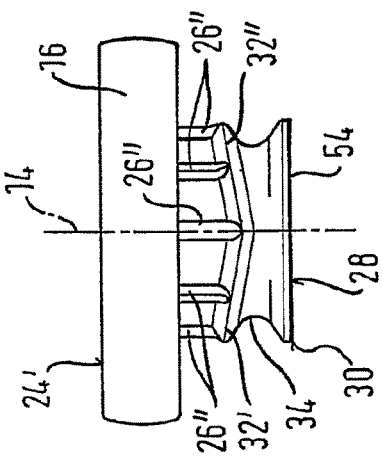

Before the manufacturing steps of FIGS. 6 to 9 are discussed, it is appropriate to explain the specific embodiment of FIG. 10 in more detail.

In this explanation the same reference numerals will be used for features or parts which have the same shape or function as in the previous embodiments and it will be understood that the previous description (as in all Figures) applies equally to such features or parts unless something different is expressed.

The special feature of the functional element of FIG. 10 lies, on the one hand, in the fact that the body section 16 has at least substantially the shape of the body section 16 of the embodiment of FIG. 4, but that the ring-like bead 32 here consists of four thread sections 32', 32" which merge into one another, with the two further thread sections not being seen because they lie at the rear side of the element 10 shown in FIG. 10.

As is evident from FIG. 10, the ring-like bead section 32' at the left hand side of the axis of symmetry (in this case the longitudinal axis 14 of the functional element) is formed as a left hand thread section and extends over 90° around the axis of symmetry whereas, at the right hand side of the axis of symmetry, the ring-like bead is formed as a section of the right hand thread which likewise extends over an angle of 90° around the central longitudinal axis.

At the rear side of the functional element in FIG. 10, a right handed thread section is formed at the left hand side of the ring-like bead 32 and on the right side a left handed thread section is formed, in both cases over an angular amount of 90° about the central longitudinal axis 14. That means that the bead also represents a closed ring here, but with a type of wave-shape in the peripheral direction.

This also leads to a situation in which the axially extending parts 26" of the ribs 26 providing security against rotation, which turn out to have different lengths down to the bottom of the ring groove 21 (see also FIG. 5), which can easily be recognized with respect to FIG. 10.

Although the ring-like bead 32 has been formed in the previous description as a closed ring this is not essential. The ring-like bead could also be formed by bead sections which are spaced from one another in the peripheral direction (not shown). This would also lead to an increase of the security against rotation.

The ring-like bead 32 could also be formed only by sections of left handed threads or right handed threads which are disposed overlappingly or with a spacing around the periphery of the piercing section.

Figure 6:
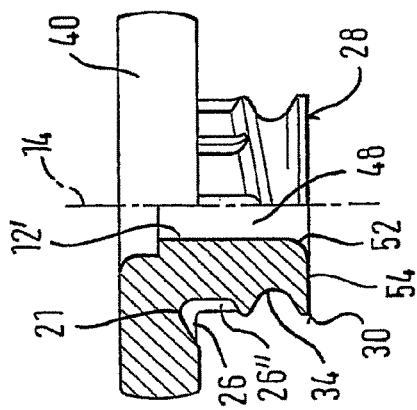
Figure 7:
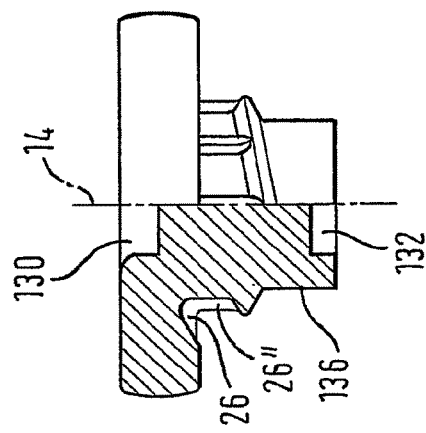

For the manufacturing of a functional element in accordance with FIG. 10, a cylindrical blank 120 in accordance with FIG. 6 is first taken and is so deformed in a first cold heading stage that the cylindrical blank adopts the shape which is shown by continuous lines in FIG. 6, i.e. the cylindrical blank in FIG. 6 retains its original diameter in the lower region 122, but is formed into a thicker cylinder 124 in the region above the plane 126, and indeed with a recess 128 in the upper end of the cylinder. This shape can then be brought by further cold heading steps closer to the envelope shape in accordance with FIG. 7 with the axially extending ring groove 21 being formed with the ribs 26 providing security against rotation in accordance with FIG. 7, and with a significant recess or an indent 130, 132 being formed in the upper end face and in the lower end face of the blank respectively. The corresponding indents 130, 132 can also be manufactured in several steps starting from FIG. 6 or, if the material permits it, can be introduced in only one step, starting from FIG. 6, into the shape of FIG. 7. Thereafter a further upsetting process takes place which leads to the formation of the ring bead 32 in accordance with FIG. 8. The special shape of the ring bead in accordance with FIG. 8, which corresponds to the course of FIG. 10, is, on the one hand, favoured by the shaping of the cold heading tool, which is moved into the axial direction coming from below in FIG. 8, but can, however, also, if required, be favoured by tool segments which engage in the radial direction between the ring-like contact flange and the ring bead and also have a corresponding shape.

In a further step, the region between the two indents 130, 132 is then pierced in order to produce the cylindrical region 12' in accordance with FIG. 9 which is later provided with a thread.

In the same step, or separate from it, the cylinder projection 136 of FIG. 8 is also so compressed by the cold heading tool that the ring-like cutting edge 130 and the ring recess 34 in accordance with FIG. 9 arise. One can see from FIG. 9 that the outer diameter of the ring-like cutting edge 30 is somewhat smaller than the diameter of the imaginary cylinder (106—only shown in FIG. 5) on which the apex 31 of the ring bead 32 lies. This is also an entirely permissible design of the functional element since it can be ensured through the shaping of the die button 60 and in particular of the ring projection 64 that the sheet metal material is not cut through by the die button in the region of the ring bead.

It is, however, also possible that the cold heading process, which leads to the formation of the ring-like cutting edge 30, also produces the shape of FIG. 10 where the outer diameter of the ring-like cutting edge is somewhat larger than the diameter of the said cylinder 106 which the apex 31 of the ring bead 32 contacts. This avoids, as is evident from FIG. 3, a situation in which the ring projection thins the sheet metal material to too large a degree in the region from the edge 30 and the apex 31 of the ring bead 32.

Finally, it should also be pointed out that for the sheet metal part all steel or aluminium or magnesium sheet metal parts can be considered which have deep drawing qualities, whereas somewhat stronger materials are used for the functional element.

In all embodiments all materials can also be named as an example for a material of the functional element which achieve the strength values of class 8 or higher in accordance with the ISO standard in the context of cold deformation, for example a 35B2 alloy in accordance with DIN 1654. The thus formed fastener elements are also suitable amongst other things for all customary traded steel materials for drawing quality sheet metal parts as also for aluminium and its alloys. Also aluminium alloys, in particular those of high strength, can be used for the functional elements, e.g. AlMg5. Also functional elements of higher strength magnesium alloys such as for example AM50 can be considered.

The invention claimed is:

1. A hollow functional element (10) having a longitudinal axis (14), a body section (16), a hollow piercing section (18), an annular contact surface (20) on the body section, which extends substantially perpendicular to the longitudinal axis (14) and radially away from the piercing section (18) and an axially extending ring groove (21) which is provided in the body section radially inside the contact surface (20), with the functional element (10) being designed for attachment to a component (22) which is of planar shape at least in the region of the attachment to the functional element, wherein the body section (16) has a pressing surface (24) at the side remote from the piercing section and wherein ribs (26) providing security against rotation are provided which cross the ring groove (21) at least in part and wherein the hollow piercing section has a free end face provided with a circular cutting edge (30) having an edge diameter, wherein a peripheral bead (32) having an apex with an apex diameter is provided at the piercing section (18) between the annular contact surface (20) and the free end face (28) of the piercing section (18), wherein a ring recess (34) is provided around the piercing section axially between the peripheral bead (32) and the free end face (28) of the piercing section and wherein said edge diameter is of the same size as said apex diameter.

2. Functional element in accordance with claim 1, wherein the ring groove (21) runs out via an at least substantially conical surface (36) to the annular contact surface (20).

3. Functional element in accordance with claim 1, wherein the peripheral bead (32) has an at least substantially triangular shape when seen in an axial section plane.

4. Functional element in accordance with claim 1, wherein the ring recess (34) is bounded by the peripheral bead (32) at the side remote from the free end face (28) of the piercing section (18).

5. Functional element in accordance with claim 1, wherein the ring recess (34) is at least substantially U-shaped when seen in an axial section plane.

6. Functional element in accordance with claim 1, wherein the ring recess (34) has at least substantially the shape of a semi-circle when viewed in an axial section plane.

7. Functional element in accordance with claim 1, wherein the functional element is formed as a hollow fastener element and has a fastener section (13) provided for the reception of a bolt.

8. Functional element in accordance with claim 1, wherein the body section (16) has a flange section (40), with the annular contact surface (20) and the axially extending ring groove (21) being provided at or in the flange section (40) at its side facing the piercing section (18).

9. Functional element in accordance with claim 1, wherein the circular cutting edge (30) at the free end of the piercing section (18) forms the transition between a cylinder surface (56) at the outer side of the piercing section (18) and the free end face (54) of the piercing section (18).

10. Functional element in accordance with claim 9, wherein the cylinder surface (56) is a cylinder surface of a circular cylinder.

11. Functional element in accordance with claim 9, wherein the axial length of the cylinder surface (56) amounts to 0.3 to 2 mm.

12. Functional element in accordance with claim 1, wherein the circular cutting edge (30) at the free end face (28) of the piercing section (18) forms the transition between a conical surface tapering in the direction of the flange section at the outer side of the piercing section (18) and said free end face (28).

13. Functional element in accordance with claim 12, wherein the conical surface tapering in the direction of the flange section merges continuously without discontinuity into the U-shaped ring recess (34).

14. Functional element in accordance with claim 12, wherein the axial length of the conical surface amounts to 0.3 to 2 mm.

15. Functional element in accordance with claim 1, wherein the axial length between the apex (31) of the bead (32) and the free end face (28) of the piercing section (18) lies in the range between 1 and 4 mm.

16. Functional element in accordance with claim 1, wherein the axial spacing between the apex (31) of the bead (32) and the annular contact surface (20) which lies in a plane perpendicular to the longitudinal axis (14) lies in the range between 0.2 and 2 mm.

17. Functional element in accordance with claim 1, wherein the radial depth of the ring recess (34) measured from the apex (31) of the bead (32) lies in the range between 0.5 and 2 mm.

18. Functional element in accordance with claim 1, wherein the ring groove (21) has a radially extending base surface and said base surface is provided on at least a part of its radial extent with the ribs (26) providing security against rotation.

19. Functional element in accordance with claim 1, wherein the ribs (26) providing security against rotation are provided which extend radially across the peripherally extending ring groove (21).

20. Functional element in accordance with claim 19, wherein the ribs (26) providing security against rotation do not project in the axial direction beyond annular contact surface (20) which lies in a plane perpendicular to the longitudinal axis.

21. Functional element in accordance with claim 1, wherein the ribs (26) providing security against rotation are provided which extend radially within and across the ring groove (21) and have axially extending sections extending axially from the ring groove up to the peripheral bead (32).

22. Functional element in accordance with claim 21, wherein the axially extending sections (26') of the ribs (26) providing security against rotation do not project in the radial direction beyond the apex (31) of the peripheral bead (32).

23. Functional element in accordance with claim 22, in which the axially extending sections (26') of the ribs (26) are set back slightly radially with respect to the apex (31).

* * * * *